Dec. 15, 1953 M. PEGARD 2,662,265
COMMON CONTROL FOR THE LOCKING
OF TWO MACHINE TOOL MEMBERS
Filed Feb. 26, 1948 2 Sheets-Sheet 1

INVENTOR.
MARCEL PEGARD
BY
ATTORNEYS

Dec. 15, 1953
M. PEGARD
2,662,265
COMMON CONTROL FOR THE LOCKING
OF TWO MACHINE TOOL MEMBERS
Filed Feb. 26, 1948
2 Sheets-Sheet 2
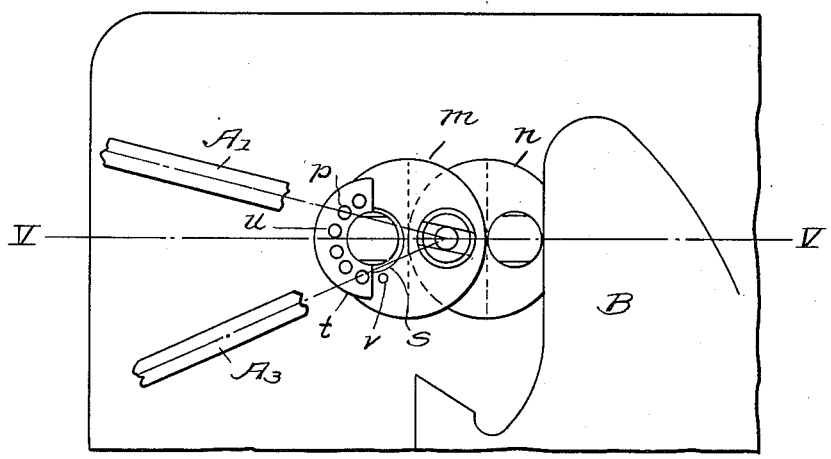
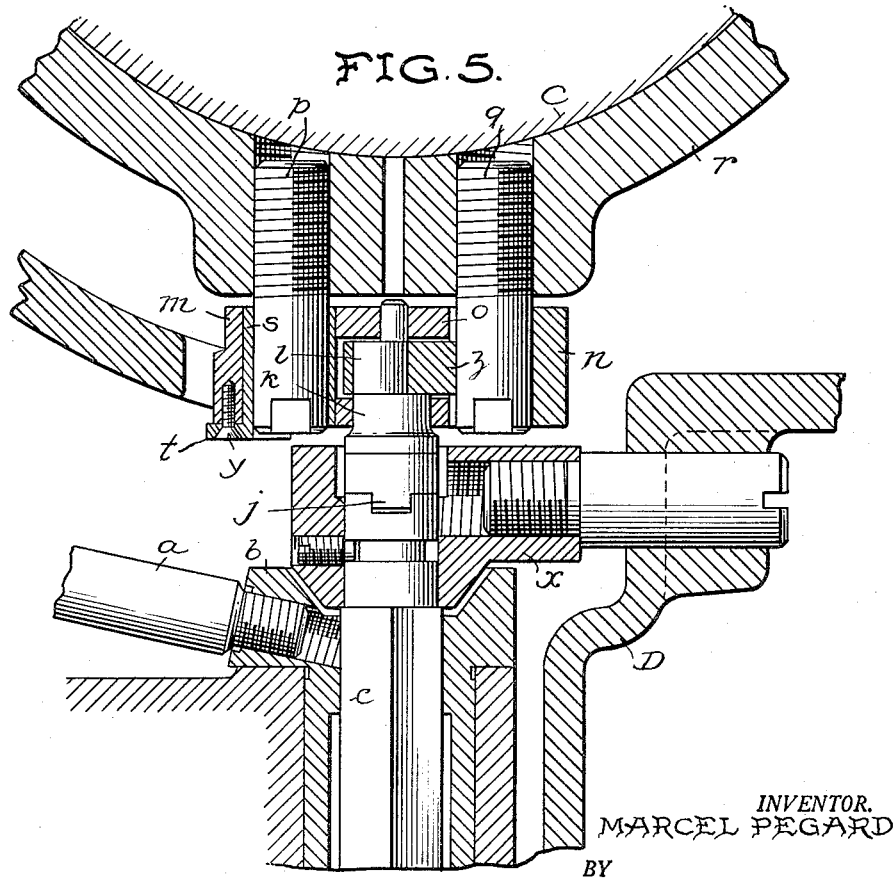
INVENTOR.
MARCEL PEGARD
BY
Pennie, Edmonds, Morton, Barrows and Taylor
ATTORNEYS Patented Dec. 15, 1953

2,662,265

UNITED STATES PATENT OFFICE 2,662,265

COMMON CONTROL FOR THE LOCKING OF TWO MACHINE TOOL MEMBERS

Marcel Pegard, Paris, France

Application February 26, 1948, Serial No. 11,174

Claims priority, application Switzerland September 4, 1947

13 Claims. (Cl. 29—1)

This invention relates to machine tools and more especially to mechanism for adjusting and locking in position adjustable parts of a machine tool such as for instance the radial arm of a drill press and the tool head mounted on such arm.

It is an object of this invention to provide adjusting and locking mechanism organized to lock in one stroke of a single control lever first one part of the machine tool to a second part and then the second part to the third part, for instance first locking an operational member such as a tool head to a structural member such as a radial arm, and then, in the continuation of the stroke, the radial arm to another structural member such as the column of a drill press or other machine tool.

It is a further object of this invention to provide a locking device of the kind described which, before effecting the locking of one part relative to the other, first acts towards abolishing any play which may exist between the relatively adjustable parts which shall be locked in position.

In the drawings affixed to this specification and forming part thereof, an embodiment of this invention is illustrated diagrammatically by way of example.

In the drawings:

Fig. 4 is a side elevational view of the column of the tool and,

Fig. 5 is a cross-section on the line V—V in Fig. 4, drawn to a larger scale.

Figure 1:
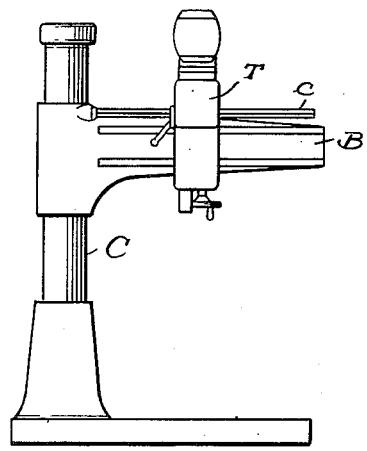
Fig. 1 is a general elevational view of a radial drill press improved in accordance with this invention.
Figure 2:
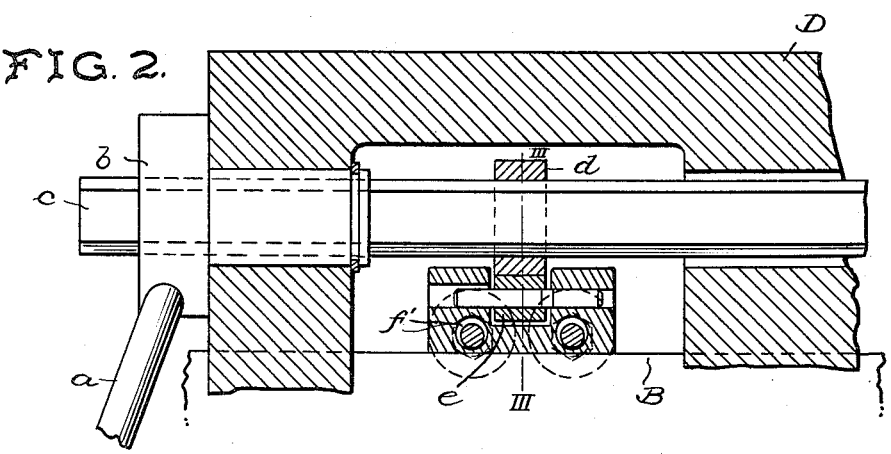
Fig. 2 is a vertical longitudinal section, drawn to a larger scale, of the means according to this invention for locking the tool head to the radial arm after having abolished all play existing between the parts.

The radial drill press (Fig. 1) comprises a column C on which slides vertically the supporting arm B. This arm is provided with slideways on which may move the carriage element D illustrated in Fig. 2 and supporting the tool carrier head T of Fig. 1.

The device according to the invention is adapted to lock both the head T with reference to the arm B and the arm B with reference to the column C by means of a single control member.

This control member is a lever $a$ fixed to a hub $b$ mounted on a horizontal bar or shaft $c$. Said bar shown in the example illustrated is of hexagonal cross section, but it might as well be square or cylindrical and provided in this latter case with keys allowing the guiding of the member. On the bar $c$ a cam $d$ is supported by the carriage D and acts on a roller $e$ which is in its turn carried by the wedge $f$ (Fig. 3), which is mounted on the carriage D by means of two threaded bolts $g$ extending with play through borings $f^1$ in the wedge. The wedge bears against an inclined surface $i$ (Fig. 3) on the arm. The profile of the cam $d$ is such that on being turned from the position $A_1$ to position $A_2$ it first acts towards removing the play between the bolts $g$ and the borings $f^1$ and thereafter forces the wedge down on the surface $i$ so as to lock the head on the carriage against the arm B.

Figure 3:
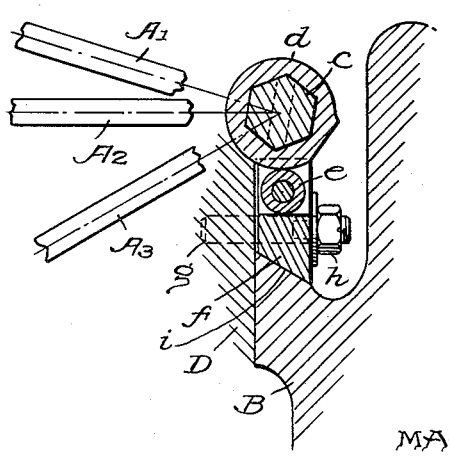
Fig. 3 is a cross-section on the line III—III in Fig. 2, drawn to a larger scale and showing the cam mechanism in the position marked A₃.

In Fig. 3, it is apparent that in the position $A_1$ of the lever $a$ the head is released, while for the position $A_2$ it is locked.

The lever $a$ then continues to move into the position $A_3$ in which it locks the arm B to the column C. This second locking action is obtained by means of the mechanism shown in Figs. 4 and 5 which is controlled by the end of the bar $c$ facing the column. It will be noted that in Fig. 5 it has been supposed that the carriage D has slid on the arm B until it approaches the column.

The bar $c$ drives through the agency of an Oldham clutch $j$ turning in the support $x$, a block $k$ on which part $l$ forms an eccentric extension which coacts with two members $m$ $n$. The first member $m$ forms a strap and between the lugs $o$ of said strap extends a collar $z$ forming part of the member $n$. The parts of the block $k$ coaxial with the bar $c$ rotate in the lugs $o$, the eccentric extension $l$ of the block $k$ operating on the collar $z$ to move the member $n$ toward and away from the member $m$. It is thus apparent that the rotation of the block brings the members $m$ $n$ nearer or further away from one another in a transversal direction. They embrace two bolts $p$, $q$, seated in the two ends of a slit ring or collar $r$ sliding on the column C. It is thus possible to lock or release as desired the collar $r$ with reference to the column.

In the position $A_1$ of the control lever (Fig. 4), the collar is released but when the lever reaches the position $A_3$ the arm B is locked on the column C.

The two locking operations involving the head D and arm B start simultaneously, but end in succession one after the other. When the circular part of the cam $d$ acts on the roller $e$ as shown for position $A_2$ in Fig. 3, the locking of the head on the arm is actually complete but the locking of the arm on the column is not yet complete, becoming so only when the lever $a$ has passed through the angle $A_2$—$A_3$. While the lever $a$ rotates from $A_2$ to $A_3$ the centric part of the cam $d$ holds the head in its locked position.

The play is removed when the lever moves through the angle $A_1$—$A_2$.

To allow removal of the initial play between the strap member $m$ and the bolt $p$, there is inserted between the member $m$ and the bolt $p$ an eccentric sleeve $s$ provided with a flange $t$ formed with a number of perforations $u$ in circular evenly spaced arrangement. The strap $m$ is also formed with a plurality of perforations $v$ spaced slightly differently from the perforations $u$. A screw $y$ serves for securing the sleeve $s$ in the desired angular position with reference to the member $m$.

The device here described as applied to a radial drilling machine is also applicable to machines having an arm slidingly seated on a column which can turn in a support and also in machines of the type used in boiler making works wherein the arm remains stationary as described but is adapted to pivot round a vertical post. The constructional details vary of course but the principle of the adjustment for making up for clearance is always retained.

What I claim is:

1. In a machine tool having at least three relatively-movable members, means for clamping one of said members to a second of said members, means for clamping said second member to the third member, a single movable control member for both of said clamping means having at least three positions, means operable upon movement of said control member to its first and second positions to actuate only the first-mentioned clamping means, and means operable upon movement of said control member to its second position to actuate the second-mentioned clamping means, both of said operable means being rendered ineffective to actuate either of said clamping means when the control member is moved to its third position.

2. In a machine tool having at least three relatively-movable members, means for clamping one of said members to a second of said members, means for adjusting said clamping means to reduce the play between said one and said second members when unclamped to an amount sufficient only to allow relative movement thereof, means for clamping said second member to the third member, means for adjusting the last-mentioned clamping means to reduce the play between said second and said third members when unclamped to an amount sufficient only to allow relative movement thereof, a single control member for both of said clamping means having at least three positions, means operable upon movement of said control member to its first and second positions to actuate only the first-mentioned clamping means, and means operable upon movement of said control member to its second position to actuate the second-mentioned clamping means, both of said operable means being rendered ineffective to actuate either of said clamping means when the control member is moved to its third position.

3. In a machine tool having at least three relatively-movable members, means for clamping one of said members to a second of said members, means for clamping said second member to the third member, a shaft carried by one of said members rotatable to at least one operative position, a cam mounted on said shaft operable to actuate the first-mentioned clamping means when the shaft is in said position, said cam and said first-mentioned clamping means being in direct engagement, and means including a block having an eccentric portion rotatable with said shaft for actuating the second-mentioned clamping means, said eccentric portion actuating said second-mentioned clamping means when the shaft is in said position, the eccentric portion of said block and said second-mentioned clamping means being in direct engagement.

4. Apparatus as defined in claim 3 in which said shaft is rotatable to at least two operative positions, said cam being operable to actuate said first-mentioned clamping means when said shaft is in both of said positions, and said eccentric portion of said block being operable to actuate said second-mentioned clamping means only when said shaft is in one of said positions.

5. In a machine tool having at least three relatively-movable members, a shaft carried by one of said members rotatable to at least two operative positions, said one and another of said members having portions thereof positioned adjacent each other, a wedge mounted adjacent said portions of said one member and said other member movable to urge them into frictional contact, means including a cam mounted on said shaft and operative in both of said positions of said shaft to move said wedge into operative position, means for clamping said one member to the third member including a split ring embracing said third member, a pair of clamping members, one carried by each of the sections of said split ring, and means actuated by said shaft when in one only of said positions for urging said clamping members together to cause said sections of said split ring to clamp said one member to said third member.

6. Apparatus as defined in claim 5 in which said means actuated by said shaft includes a block rotatable with said shaft and having a cylindrical portion and an eccentric portion, one of said clamping members having a projection extending toward the other of said clamping members and embracing said cylindrical portion of the block, and said other clamping member having a projection extending toward said one clamping member and engaging said eccentric portion of the block.

7. Apparatus as defined in claim 6 in which said clamping members are journalled on bolts threaded to the sections of said split ring, and one of said clamping members has a rotatable adjustable eccentric sleeve between it and the bolt on which it is mounted to permit adjustment of the distance between said bolts.

8. In a machine tool having a column, an arm adjustably mounted on said column and a tool carrier adjustably mounted on said arm, means for clamping said tool carrier to said arm, means for clamping said arm to said column, a shaft carried by said arm rotatable to at least two operative positions, means carried by said shaft for actuating the first-mentioned clamping means when said shaft is in either of said positions, and means operated by movement of said shaft to one only of said positions to actuate the second-mentioned clamping means, whereby said arm, said tool carrier and said column are all locked together when said shaft is in said one position, and said arm and said tool carrier are clamped together without their being locked to said column when said shaft is in the other position.

9. Apparatus as defined in claim 8 having a carriage movable along said arm longitudinally thereof, said tool carrier being mounted on said carriage, said carriage and said arm having portions thereof adjacent each other, said first-mentioned clamping means including a wedge mounted on said carriage and movable to urge said adjacent portions of the arm and carriage together, and in which said first-mentioned actuating means includes a cam mounted on said shaft for rotation therewith and operable to move said wedge against said portion of the arm to urge the arm and carriage into frictional engagement when said shaft is in either of said positions.

10. Apparatus as defined in claim 9 having means for adjusting the position of said wedge with respect to said portions of the arm and carriage to reduce the play between said portions of said arm and said carriage when said wedge is inoperative to an amount sufficient only to allow relative movement thereof.

11. Apparatus as defined in claim 8 having a block rotatable with said shaft, said block having a cylindrical portion and an eccentric portion, said second-mentioned clamping means including a split sleeve embracing said column, each section of said sleeve having a clamping member mounted thereon, one of said clamping members having a projection extending toward the other clamping member and embracing said cylindrical portion of said block, the other clamping member having a projection extending toward said one clamping member and embracing said eccentric portion of said block, said eccentric portion being operable when said shaft is moved to said one position to move said other clamping member toward said one clamping member to cause said split ring to contract and clamp said arm to said column.

12. Apparatus as defined in claim 11 having means for adjusting the distance between said clamping members to reduce the play between said arm and said column when said split ring is unclamped to an amount sufficient only to allow relative adjustment of said arm and said column.

13. In a machine tool having a column, an arm adjustably mounted on said column and a tool carrier adjustably mounted on said arm, a carriage movable along said arm longitudinally thereof, said tool carrier being mounted on said carriage, said carriage and said arm having portions thereof adjacent each other, a wedge mounted on said carriage and removable to urge said adjacent portions of the arm and carriage together, a shaft carried by said arm rotatable to at least two operative positions, a cam mounted on said shaft for rotation therewith and operable to move said wedge against said portion of the arm to urge the arm and carriage into frictional engagement when said shaft is in either of said positions, a block rotatable with said shaft, said block having a cylindrical portion and an eccentric portion, a split sleeve embracing said column, each section of said sleeve having a clamping member mounted thereon, one of said clamping members having a projection extending toward the other clamping member and embracing said cylindrical portion of the block, the other clamping member having a projection extending toward said one clamping member and embracing said eccentric portion of the block, said eccentric portion being operable when said shaft is moved to one only of said positions to move said other clamping member toward said one clamping member to cause said split ring to contract and clamp said arm to said column.

MARCEL PEGARD.

References Cited in the file of this patent
UNITED STATES PATENTS

| Number | Name | Date |
|---|---|---|
| 1,967,409 | Klausmeyer et al. | July 24, 1934 |
| 2,019,509 | Schauer et al. | Nov. 5, 1935 |